Patented Sept. 6, 1932

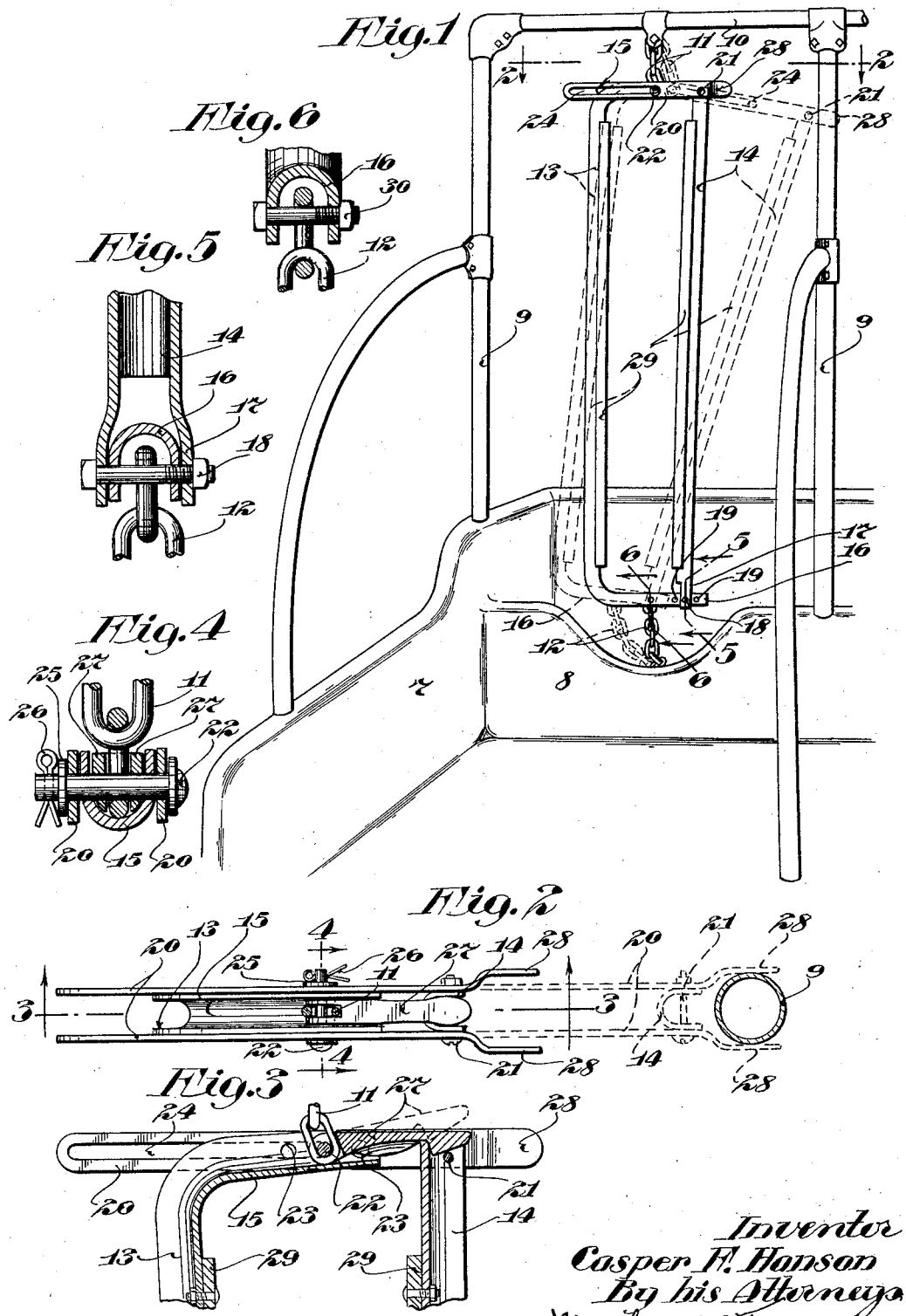

1,876,141

UNITED STATES PATENT OFFICE

CASPER F. HANSON, OF ALBERT LEA, MINNESOTA, ASSIGNOR TO OLSON MANUFACTURING COMPANY, OF ALBERT LEA, MINNESOTA, A CORPORATION OF MINNESOTA

STANCHION

Application filed March 29, 1930. Serial No. 439,967.

My present invention has for its object the provision of an extremely simple and highly efficient stanchion for barn equipment, and to this end, it consists of the novel devices and combinations of devices hereinafter described and defined in claims.

The improved stanchion is made up of few parts substantially all of which are machine made and easy to assemble, thus producing a structure that can be manufactured at a comparatively small cost and at the same time is rigid, strong and durable, easy to operate and cannot be accidentally released.

In the accompanying drawing, which illustrates the invention, like characters indicate like parts throughout the several views.

Referring to the drawing:

Fig. 1 is a fragmentary perspective view of a barn stall structure equipped with the improved stanchion;

Fig. 2 is a view partly in plan and partly in section taken on the line 2—2 of Fig. 1, on an enlarged scale, some parts being shown in different positions by means of broken lines;

Fig. 3 is a fragmentary detail view principally in section taken on the line 3—3 of Fig. 2;

Fig. 4 is a fragmentary detail view principally in section taken on the line 4—4 of Fig. 2, on an enlarged scale; and Figs. 5 and 6 are fragmentary detail views principally in section taken on the lines 5—5 and 6—6 of Fig. 1, on an enlarged scale.

The stall structure illustrated is indicated, as an entirety, by the numeral 7 with the exception of the partition 8 between the manger and stall proper, uprights 9 at the sides of the stall and in substantially the plane of said partition, and a top tie-bar 10 connecting said uprights.

The improved stanchion is of the floating type held suspended over the partition 8 by a short chain 11 secured to the tie-bar 10 midway between the uprights 9. A loose short chain 12, anchored to the partition 8, and attached to the bottom of the stanchion limits the swinging movement of the stanchion.

As shown, the stanchion comprises a relatively stationary upright member 13 and a cooperating substantially parallel movable member 14 each of said members being formed from a single U-bar. The end portions of the member 13 are bent into horizontal positions in the plane of the stanchion to form top and bottom extensions or members 15 and 16, respectively. All of the sides or flanges of the U-bars forming the members 13 to 16, inclusive, project outward and in the plane of the stanchion.

On the lower end of the member 14 is a pair of depending hinge lugs 17, formed by cutting away the transverse portion of said member, between which the bottom member 16 extends and is connected thereto by a nut-equipped bolt 18 that projects through one of a plurality of pairs of holes 19 formed in the sides of said bottom member. By adjusting the bolt 18 in the different holes 19, the distance between the members 13 and 14 at the bottom of the stanchion may be varied at will, depending on the size of the stock to be held in the stanchion. The hinge 17—18 connects the member 14 to the bottom member 16 for swinging movement in the plane of the stanchion from a closed position, as shown by full lines in Fig. 1, to an open position, as indicated by broken lines in said figure. This type of hinge 17—18 also securely holds the member 14 from turning about its longitudinal axis on the bottom member 16.

A pair of laterally spaced parallel straps 20 form a connection between the upper end of the member 14 and the top member 15 and which members extend between said straps. These tie straps 20 near one of their ends are connected to the member 14 for slight vertical swinging movement by a horizontal pivot 21 in the form of a nut-equipped bolt which extends through aligned holes in said straps and member 14. Said tie straps 20 are connected to the top member 15 for compound pivotal and endwise sliding movement by a horizontal headed pin 22 which extends through one of a plurality of pairs of holes 23 in the sides of said top member and through long longitudinal slots 24 in said straps. A washer 25 and a cooperating cotter pin 26 hold the pin 22 against removal from the top member 15 and tie straps 20 and together with said pin hold the straps 20 against lateral movement from the sides of the top member 15 with which they slidably contact. The tie straps 20 by their engagement with the pin 22, at the inner ends of their slots 24, limit the closing movement of the member 14 and their engagement with said pin at the outer ends of said slots limit the opening movement of the member 14.

By adjusting the pin 22 from one pair of holes 23 to the other the width of the stanchion between the members 13 and 14, at the top thereof, may be varied, at will, to keep the member 14 substantially parallel to the member 13 when closed and to compensate for the adjustments of the lower end of the member 14 on the bottom member 16.

A hook-acting latch 27 is provided for holding the member 14 closed and which latch is pivoted on the pin 22, between the sides of the top member 15, for vertical swinging movement and is gravity held interlocked with the transverse portion of said member 14, see Fig. 3. The pivoted end of the latch 27 is bifurcated and the lower link of the chain 11 extends between the prongs thereof and the pin 22 extends through said link to connect the stanchion to the chain 11.

It will be noted that when the member 14 is held closed by the latch 27 the tie straps 20, at the inner ends of their slots 24, engage the pin 22 and thereby securely hold the member 14 against inward movement while the latch 27 holds the same against outward movement. Said latch 27 between its prongs engages the lower link of the chain 11 and holds the same oblique so that the weight of the stanchion tends to straighten said link and thereby holds the latch 27 closed. When the latch 27 is closed, the same is entirely within the upper end of the member 14 and the top member 15 and is protected thereby so that it can not be accidentally opened by the animal held in the stanchion or otherwise.

By adjusting the pin 22 from one pair of holes 23 to the other, to vary the width of the stanchion, the latch 27 is carried thereby so that in the various different adjustments of the member 14 it always has the same length of travel to and from a closed position.

The end portions of the tie straps 20, at the member 14, are extended outward thereof and laterally offset from each other to form a fork 28 arranged to embrace the right hand upright 9 in respect to Fig. 1, when the member 14 is open, as indicated by broken lines in said figure and thereby hold the stanchion in position.

Wooden facing strips 29 are secured to the opposing faces of the members 13 and 14 and with which the neck of the animal has direct contact. The pin 22 performs four important and distinct functions, to wit: first, connects the tie straps 20 to the top member 15; second, holds the tie straps 20 against lateral movement from the top member 15; third, forms a pivot for the latch 27; and fourth, forms a connection between the chain 11 and stanchion.

By using a pin instead of a bolt for the connection 22, there is no danger of the same tightening up and clamping the several parts together, it eliminates the use of spacing sleeves that are necessary in case a nut-equipped bolt is used and in which instance the width of the slots 24 would have to be much wider to receive said sleeves, and hence, the tie straps 20 would have to be made from wider stock than is now used. The upper link of the chain 12 extends between the sides of the bottom member 16 and is secured thereto by a nut-equipped bolt 30.

What I claim is:

1. A stanchion including a relatively stationary member having a top extension that is channel-shaped in cross section, a bar hinged at its lower end to said member for outward swinging movement, a pair of parallel tie members one on each side of the bar and pivoted to the top thereof, said tie members having longitudinally extended slots, said top member having in its sides a plurality of longitudinally spaced pairs of holes, a pin insertable through any one pair of said holes and the slots for connecting the tie members to the top extension and having on its ends means for holding the tie members against outward movement from the top member, said tie members by their slot and pin connections with the top member, limiting both the opening and closing movements of the bar, said tie members being extended outward of said bar to form a fork arranged to engage a stall member when the stanchion is open to hold the stanchion in position, and a latch for holding the relatively stationary member and the hinge member in operative position.

2. A stanchion including a relatively stationary member having a top extension that is channel-shaped in cross-section, a bar hinged at its lower end to said member for outward swinging movement, a pair of tie members one on each side of the bar and attached to the top thereof, overlapping said top extension which extends therebetween and having longitudinally extended slots, a pin extending transversely through the sides of the top extension and said slots for connecting the tie members to the top extension and having means for holding the same against lateral movement therefrom, a latch-acting hook pivoted on the pin between the sides of the top extension and arranged to engage the bar to hold the same closed, and a cable attached to the pin for holding the stanchion suspended from an overhead support.

3. The structure defined in claim 2 in which the latch when holding the bar closed holds the tie members, at the inner end of their slots, against the pin.

4. A stanchion including a relatively stationary member having a top extension, a bar hinged at its lower end to said member for outward swinging movement, a pair of parallel horizontal tie-straps bearing one on each side of the bar and intermediately pivoted thereto, said tie-straps being extended outward of the hinged bar to afford a fork arranged to engage a relatively fixed support when said bar is open, said tie-straps also having longitudinal slots, pivot means anchored to the top extension, extending through the slots and engaging the outer surfaces of the tie-straps to hold the same against the sides of the top extension with freedom for compound pivotal and endwise movements, said tie-straps by their engagement with the top extension hold the bar against lateral movement in respect to the stanchion, and a latch for holding the relatively stationary member and the hinge member in operative position.

5. A stanchion including a relatively stationary member having a channeled top extension and a cooperating upright bar hinged at its lower end to the member for opening and closing movements in the plane of the stanchion, a horizontally disposed latch-acting hook in the channeled top extension, the rear end of said hook being bifurcated, a horizontal pin extending through the prongs of the bifurcated end of the hook and pivotally connecting the same to the top extension for vertical swinging movement, and means for suspending the stanchion from an overhead support including a loose link between the prongs of the bifurcated end of the hook and through which link the pivot pin extends, said hook being constructed and arranged to engage the link and hold the same in a rearwardly and upwardly inclined position, whereby the weight of the suspended stanchion acting on the link tends to move the link into an upright position and thereby hold the hook in an operative position.

In testimony whereof I affix my signature.

CASPER F. HANSON.